Patented May 30, 1950

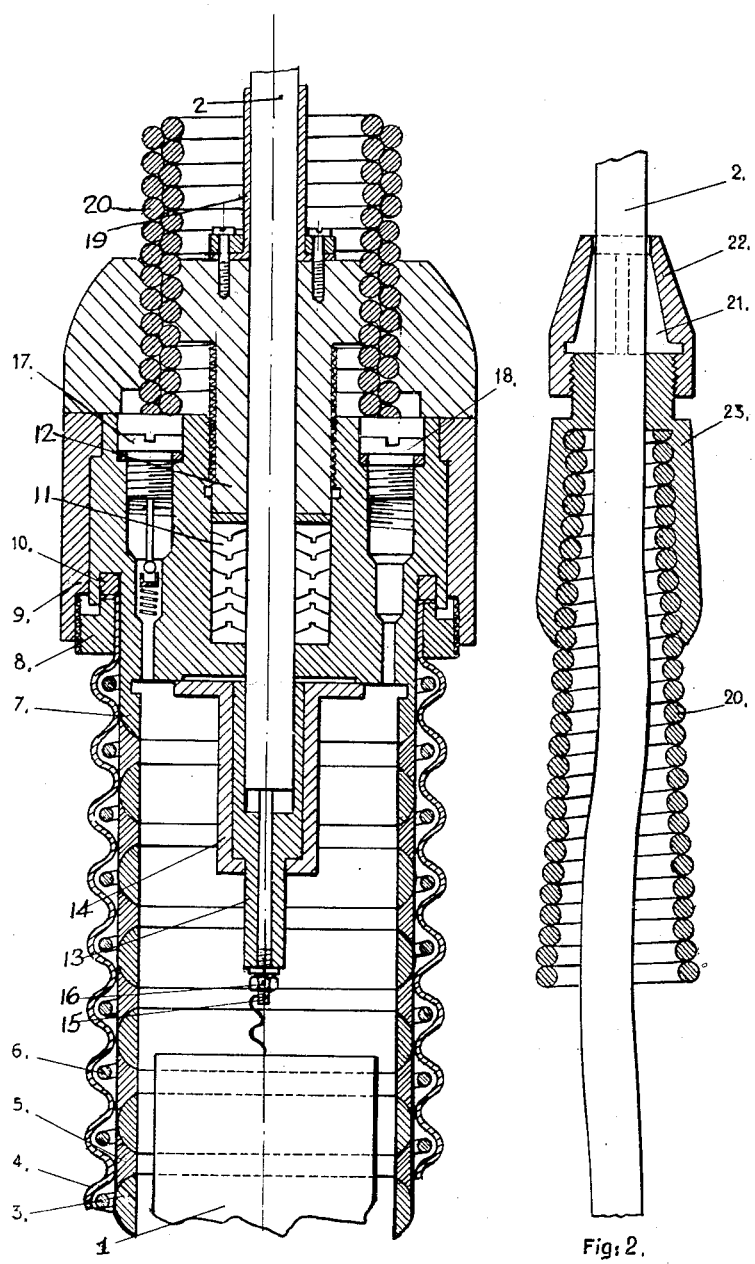

2,509,524

UNITED STATES PATENT OFFICE 2,509,524

FLEXIBLE JUNCTION FOR SUBMARINE CABLES

Georges Pouzet, Paris, France, assignor to Compagnie General D'Electricite, Paris, France, a corporation of France Application October 16, 1947, Serial No. 780,277
In France October 16, 1946

4 Claims. (Cl. 174—18)

The present invention is concerned with flexible housings or junction boxes for use on submarine cables, to resist pressure at great depths and to contain the mechanical or electrical appliances, in particular the amplifiers or repeaters required for the operating of submarine cables.

The application of Paul Martin for "Improvements to mechanical apparatus functioning under pressure, particularly submarine telephonic repeaters," Ser. No. 624,271, filed October 24, 1945, demonstrates the principle of such a junction box by means of a flexible casing containing an incompressible insulating liquid, capable of balancing itself, under pressures, with the depth pressure, in which are mounted the appliances constituting the electrical equipment, either directly or in watertight casings resistant to depth pressures.

The present invention relates to a special design of a flexible junction box for a submarine cable, on the basis of the mentioned principle.

According to this principle, the flexible body of the junction box, containing the pressure equalising liquid, should fulfil the following conditions:

It should be tight against seawater and be impervious to its action;

It should be sufficiently pliable to ensure that no appreciable difference in pressure between the interior and the exterior of the junction box can set in, particularly at low pressures while immersing;

It should be sufficiently flexible to wind over the cable-laying machines;

It should not collapse under the force of laying strains while traveling over the capstan of the cable ship or over the pulleys or drums fixed at front or rear of the cable ship, at the time of laying;

It should ensure electrical continuity not only of the central conductor, but also of the concentric conductor of the cable.

To satisfy these different conditions, the flexible body of the junction box is constituted by a copper cylindrical tube having fluted surfaces, the flutings supported on pressure-resistant steel rings resting on a supporting bearing, an arrangement embodying certain effective features for the advantageous employment of such a junction box adapted, as it is, for internal filling with a pressure-balancing liquid. These features, which are the object of this present invention, are explained in the following description:

In the application of this junction box here described, the thickness of the pressure-resistant rings can be reduced, their purpose being simply to prevent the flexible body from collapsing when being passed over the cable-laying machinery, under the force of the strain during laying.

To increase the flexibility of the cylindrical body, it is proposed to increase the depth of the surface flutings and to reduce the thickness of this surface wall.

Following the lines of the present invention, it is also proposed to submit the cylindrical junction body filled with insulating liquid to an initial internal pressure higher than the atmospheric pressure, the volume of the pressure chosen being equal to, or preferably higher than that necessary to deform from outside the flexible body of the junction box. Thus, during immersion of the apparatus, the watertight fittings at the ends of the flexible body will be submitted to a pressure, coming from the interior of the box, higher than the external pressure resulting from the depth of the water, up to the moment when the water pressure is great enough to deform the flexible body of the junction box and equalise the pressures between the interior and the exterior of the junction box, thus preventing any penetration by water through the watertight joints. Another effect of this initial pressure application, which deforms the flutings towards the exterior, is to ensure absolutely the pressure regulation of the box under the applied force of depth pressure; for the interior deformation of the interior surface towards the exterior affords the latter a certain play in relation to the supporting bearings, and facilitates deformation in the inverse sense, towards the interior under the action of the pressure at the depth.

The diagrams shown on the attached drawing show the object of the present invention, and some modified forms.

Fig. 1 shows in section a portion of the hollow cylindrical body of the junction box and one arrangement for the end of the junction body, embodying the terminal piece for cable entry and the members for ensuring impermeability and for filling the junction body with the insulating liquid.

Fig. 2 shows the extremity of the flexible junction piece, with progressive passage from the diameter of the cable to the diameter of the junction box.

In these diagrams, 1 shows one of the essential electrical parts as a repeater mounted in the flexible junction box and attached to the two submarine cables; 2 shows one of the submarine cables. The flexible cylindrical junction body 3 preferably constituted by a copper cylindrical tube having fluted or undulated peripheral surfaces, is supported by steel rings 4 and 5 through the intermediary of a supporting member 6.

According to a preferred form of the present invention, the steel rings 4 and 5 fit into one another along surfaces of spherical contact, but they may be of another form without going beyond the scope of the present invention.

The supporting member 6 may be made up of successive rings if the flutings or undulations of the wall of cylindrical junction body 3 are parallel, or on the contrary they can take the form of a spiral coil if the flutings of junction body 3 are themselves of spiral form, in fact the supporting member 6 can be of circular section or otherwise; it may be metallic or not, solid or hollow, according to the degree of flexible deformability which it is desired to confer on the surface of the flexible box 3 when under depth pressure, in order to bring about perfect pressure equilibrium between the interior and the exterior of the junction box or body.

The mechanical connection of the junction body 3 with the end piece 7, which is of bronze or copper, as well as tight packing between these two parts, is assured by the combined action of the screwed pieces 8 and 9, also of copper, and of the inset packing joint 10. Of course, tightness between tube 3 and end piece 7 can be achieved in any other manner, and in particular by soldering.

The end-piece 7 is traversed by the cable 2 stripped of its covering as far as the insulation. Tightness between this end piece 7 and the cable 2 is ensured by ringed packing joints 11 compressed by the metal cap clamping device 12.

The metal end piece 7 has an axial bore extending part of the way therethrough, in the bottom of which bore the packing 11 is positioned. A shoulder on clamping device 12 extends part way into the axial bore of end piece 7, which shoulder threadedly engages the wall of the axial bore of end piece 7. These packing joints 11 are made of impermeable material easily deformed, resistant to seawater action and to the pressure equalising liquid inside the junction body. Their design is such as to render them self-packing under the action of pressure applied either from the interior or from the exterior of the junction box.

The cable passes through a traverse cable-entry terminal made of insulating protective metal 13 of high mechanical resistance and having a protective metal mechanical guard 14 molded in with it whose flange is fixed to the end piece 7. The cable conductor 15 is fixed against the cable-entry guard by the nut 16 screwed on to the threaded end of the conductor, and is connected to the electrical repeating apparatus 1.

A little play is left between the flange of the cable-entry guard 14 and the part 7 to enable the pressure equalising liquid to act on the joint 11 and on the length of cable in the terminal.

Further, the end piece 7 has openings to allow application of a vacuum and application of pressure to the flexible junction body 3 by means of the pressure equalising liquid. These openings are closed by screw-plugs 17 and 18 or by any other suitable device.

The outer concentric conductor 19 of the cable is mechanically fixed to clamping piece 12 and electrically connected to end piece 7 by a flexible piece (not shown) passing across clamping piece 12 and soldered at the extremities to the appropriate connections. The end piece 7 is in turn connected to the ground terminal of the electrical apparatus 1 by a flexible connection (not shown) soldered at the ends to the appropriate connections. In this way the electrical continuity of the concentric conductor is perfectly ensured through soldered contacts.

Adjustment between the extremities of the cylindrical body of the junction box and the cables is effected by means of a flexible member of conical frustrum type 20. It may be constructed, in particular, as shown in Figs. 1 and 2, by a copper spiral coil, in one or more elements, one end of which is screwed on to the clamping piece 12 and the other end secured on the cable 2, e. g., as shown in Fig. 2 by the assemblage of bushes 21 of conical exterior form as outlined by the piece 22 screwing on to the piece 23 which itself screws on to the extremity of the spiral coil 20. Care is observed in fixing to allow the cable a certain slackness between its entry into the end piece 7 and the extremity of the coil 20, to enable the cable to deform when being laid, without exercising any "drag" on the cable at the entrance to end piece 7.

After fitting the junction box to the two cables to be connected, the junction box is provided with a resilient jacket—of textile, rubber or other material—then covered with an armor which will be connected to the cables on both sides of the junction box.

It will be apparent to those skilled in the art that my invention is susceptible of modifications to adapt the same to particular conditions, and all such modifications which are within the scope of the appended claims I consider to be comprehended with the spirit of my invention.

Having now particularly described and ascertained the nature of said invention and in what manner the same is to be performed, I declare that what I claim is:

1. In a junction box housing for submarine cables, a flexible, metallic, cylindrical tubular casing, interlocking sets of metal rings forming a substantially continuous cylindrical surface, adapted to fit within said casing adjoining the radially innermost points of the flutings thereof, deformable support means mounted within the inner faces of said flutings between said casing and said rings and adapted to deformably support said casing on said rings, a metal end piece having a cylindrical portion fitting within one end of said casing, means comprising metal packing rings carried by said end piece for tightly holding the end of said casing against said cylindrical portion of said end piece, said end piece being provided with an axial aperture adapted to receive a cable end, a metal cap member tightly secured to said end piece and having an axial aperture for the passage of a cable end therethrough, packing means retained by said cap member against said cable end and the aperture in said end piece through which said cable end passes, an insulating terminal member surrounding the portion of said cable end projecting inside said casing beyond said end piece, and a metal guard surrounding said terminal member and fixed to the inner face of said end piece, said end piece being provided with valve controlled channel inlet means for introducing liquid under pressure within said casing.

2. A housing according to claim 1, the face of said end piece adjacent said guard being slightly recessed adjacent said cable end for receiving therein pressure fluid from the interior of said casing.

3. A housing according to claim 1, said end piece being provided with an axial bore extending for a fraction of its thickness from its end remote from the interior of said casing, said packing means being positioned in the bottom of said bore surrounding said cable, and said cap member having a threaded stud portion which threadedly engages the interior of said bore and holds said packing means tightly in said bore.

4. A housing according to claim 1, and said cap member being provided exteriorly with a helical groove, and a conical helical metal coil having at one of its ends, turns received within said groove, and bushing means carried on said cable end at a point spaced from said housing and provided with an internal groove wherein are received turns of the other end of said coil.

GEORGES POUZET.

REFERENCES CITED

The following references are of record in the file of this patent:

UNITED STATES PATENTS

| Number | Name | Date |
|---|---|---|
| 2,110,457 | Wentz | Mar. 8, 1938 |